United States Patent
Godoy

(10) Patent No.: US 10,228,480 B2
(45) Date of Patent: Mar. 12, 2019

(54) SEISMIC DATA ACQUISITION SYSTEM

(71) Applicant: POLARCUS DMCC, Dubai (AE)

(72) Inventor: Erik Godoy, Nesbru (NO)

(73) Assignee: POLARCUS DMCC, Dubai (AE)

( * ) Notice: Subject to any disclaimer, the term of this patent is extended or adjusted under 35 U.S.C. 154(b) by 381 days.

(21) Appl. No.: 14/915,327

(22) PCT Filed: Aug. 28, 2014

(86) PCT No.: PCT/GB2014/052608
§ 371 (c)(1),
(2) Date: Feb. 29, 2016

(87) PCT Pub. No.: WO2015/028802
PCT Pub. Date: Mar. 5, 2015

(65) Prior Publication Data
US 2016/0209535 A1  Jul. 21, 2016

(30) Foreign Application Priority Data

Aug. 30, 2013  (GB) .................................. 1315511.4

(51) Int. Cl.
*G01V 1/38* (2006.01)
*B66D 1/60* (2006.01)
(Continued)

(52) U.S. Cl.
CPC ............ *G01V 1/3843* (2013.01); *B63B 21/66* (2013.01); *B65H 75/146* (2013.01);
(Continued)

(58) Field of Classification Search
CPC .......... B66D 1/30; B66D 1/60; B65H 75/425; B65H 75/146; G01V 1/3843; G01V 1/3808; B63B 21/66
(Continued)

(56) References Cited

U.S. PATENT DOCUMENTS 2,334,141 A * 11/1943 Zierden ................ B65H 75/364
137/355.28
3,010,594 A   11/1961 Farmer et al.
(Continued)

FOREIGN PATENT DOCUMENTS

| EP | 0877262 A2 | 11/1998 |
| GB | 2493067 A | 1/2013 |
| WO | 2014/190973 A1 | 12/2014 |

OTHER PUBLICATIONS

German text of Barg et al. (WO 2014/190973) with paragraph numbers added, document created Apr. 27, 2018 11 pages. (Year: 2014).*

(Continued)

*Primary Examiner* — Daniel L Murphy
(74) *Attorney, Agent, or Firm* — Bacon & Thomas, PLLC

(57) ABSTRACT

A seismic data acquisition system comprising a composite marine seismic cable and a winch, the composite marine seismic cable comprising a sensor cable and a lead-in cable for providing electrical connections to the sensor cable, and the winch comprising a first cable compartment for the lead-in cable and a second cable compartment for the sensor cable, wherein the lead-in cable and the sensor cable may be deployed or recovered independently of each other. There is also a method of deploying a composite seismic cable comprising a lead-in cable and a sensor cable.

18 Claims, 8 Drawing Sheets

(51) Int. Cl.
*B66D 1/30* (2006.01)
*B65H 75/42* (2006.01)
*B65H 75/14* (2006.01)
*B63B 21/66* (2006.01)

(52) U.S. Cl.
CPC .............. *B65H 75/425* (2013.01); *B66D 1/30* (2013.01); *B66D 1/60* (2013.01); *G01V 1/3808* (2013.01)

(58) Field of Classification Search
USPC .......................................................... 367/20
See application file for complete search history.

(56) References Cited

U.S. PATENT DOCUMENTS

| | | |
|---|---|---|
| 3,958,594 A | 5/1976 | Masters |
| 4,570,245 A | 2/1986 | Thigpen |
| 5,632,219 A | 5/1997 | Fleming, Jr. |
| 6,053,255 A | 4/2000 | Crain |
| 2004/0196737 A1 | 10/2004 | Nicholson |
| 2013/0146827 A1 | 6/2013 | Serra |

OTHER PUBLICATIONS

Machine translation into English of German text of Barg et al. (WO 2014/190973) with paragraph numbers added; document created Apr. 27, 2018, 13 pages. (Year: 2014).*

International Search Report and Written Opinion of International Application No. PCT/GB2014/052608 dated Nov. 28, 2014.

UK Examination Report in Application No. GB1315511.4 dated Feb. 4, 2014.

UK Examination Report in Application No. GB1315511.4 dated Oct. 24, 2016.

\* cited by examiner

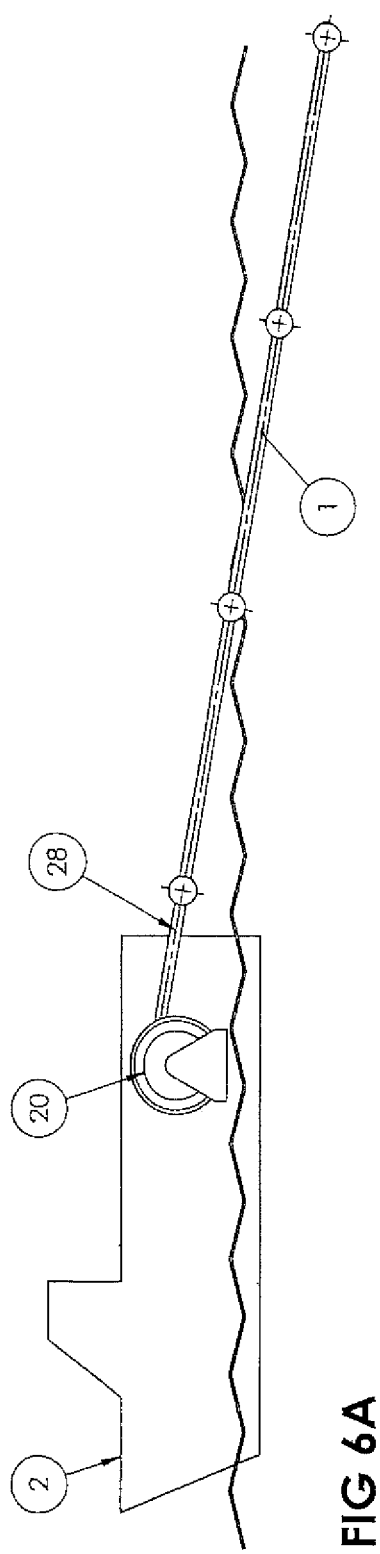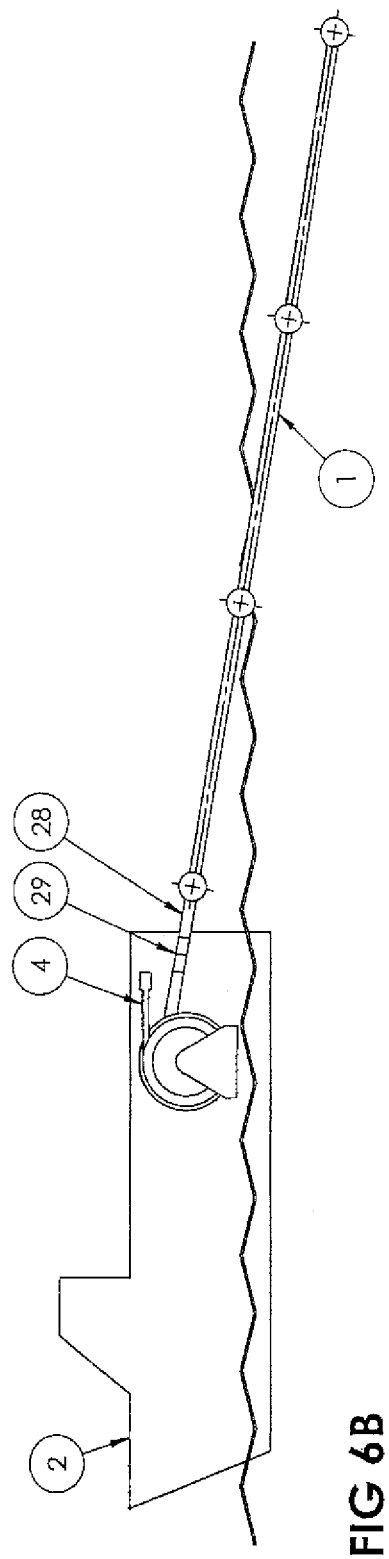

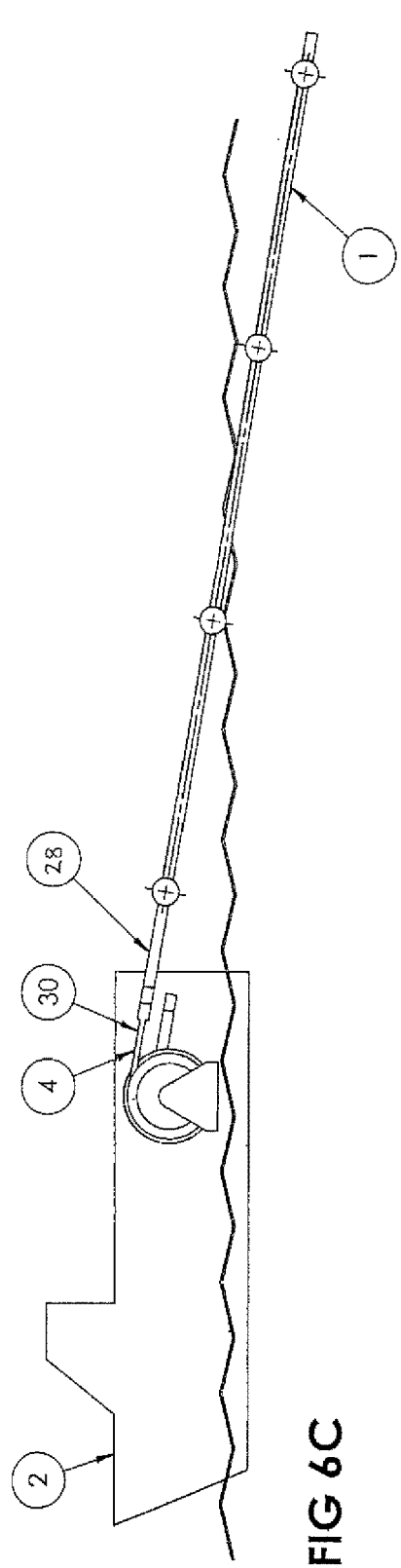
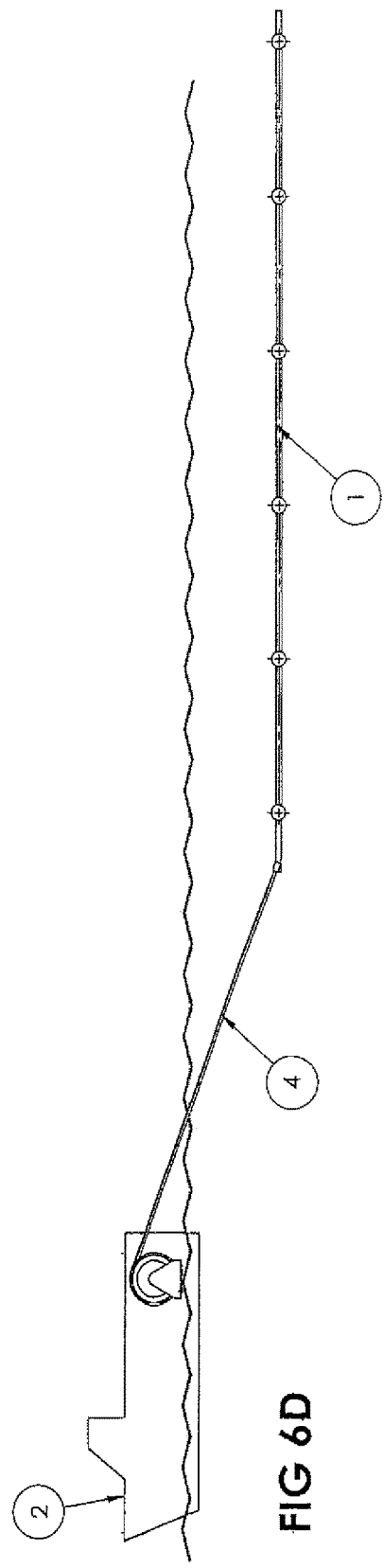

SEISMIC DATA ACQUISITION SYSTEM

The present invention relates to a winch, and in particular, a winch for use with a composite seismic cable for towing behind a survey vessel at sea.

Marine seismic data acquisition is normally done by towing multiple, typically 6-14, sensor cables 1 behind a vessel 2 as is shown schematically in FIG. 1. Each sensor cable is typically 4-12 km long and has hydrophone sensors 3 and/or other types of sensors equally spaced along the cable. The sensor cable is made up of several sections typically 150 meters long allowing the length of the sensor cable to be changed.

The sensor cable is connected to the vessel by a lead-in cable 4 providing electrical power to the sensor cable. It is also used for transmitting data signals to and from the sensor cable. The lead-in cable is typically 1000-1500 meters long.

Onboard the vessel the cable system—i.e. the lead-in cable and sensor cable—is normally stored on a common winch 5, as shown in FIG. 2. When stored on a common winch, the lead-in cable 4 is spooled up first so that it lies at the bottom (i.e. near the centre) of the winch drum 6 and the sensor cable 1 is spooled on top of the lead-in cable.

There are two main problems with the common winch arrangement: firstly, there is no access to the lead-in cable when the cable system is stored onboard the vessel, making it time-consuming and difficult to do maintenance and repairs of the lead-in cable; and secondly, it is time consuming to change length of the sensor cable—cable sections must be removed or added in order to change sensor cable lengths.

The traditional solution to the problems described above is illustrated in FIGS. 3 and 4A to 4D. This uses separate winches 11, 12 for the sensor cable 1 and lead-in cable 4 respectively, and is referred to as the two-winch solution. When the cable system is to be used, the sensor cable 1 is first deployed from its winch 11 before the lead-in cable 4 is deployed from its winch 12. The cables are connected together during the deployment process at a connection point after the desired length of sensor cable has been deployed with the desired length of lead-in cable being deployed subsequently. Recovery is similar but reversed.

The two-winch solution described above gives increased operational flexibility and allows easier maintenance and repair of the lead-in cable. It also allows sensor cable lengths to be changed significantly more efficiently than with the common winch arrangement. Thus, the key advantages are: (1) when the cable system is stored on board, the lead-in cable is always available for inspection and repairs; (2) any damaged or defective lead-in cable can easily be removed and replaced with a new one; and (3) it is easy to change lengths of sensor cables. However, this system does also have significant disadvantages: (1) there is significant added cost since number of winches is doubled; and (2) there are additional space requirements—most vessels have limited deck space and so there may not be room for additional winches.

According to the present invention there is provided a winch system for use with composite marine seismic cables comprising a sensor cable and a lead-in cable for providing electrical connections to the sensor cable, the winch system comprising a winch having a first cable compartment for the lead-in cable and a second cable compartment for the sensor cable, wherein the lead-in cable and the sensor cable may be deployed or recovered independently of each other.

The present invention also provides a seismic data acquisition system comprising a composite marine seismic cable and a winch, the composite marine seismic cable comprising a sensor cable and a lead-in cable for providing electrical connections to the sensor cable, and the winch comprising a first cable compartment for the lead-in cable and a second cable compartment for the sensor cable, wherein the lead-in cable and the sensor cable may be deployed or recovered independently of each other.

The present invention also provides a winch system for use with composite marine seismic cables comprising a sensor cable and a lead-in cable for providing electrical connections to the sensor cable, the winch system comprising a winch having a first cable compartment for the lead-in cable, a second cable compartment for the sensor cable, and a slip ring box mounted in an axle of the winch, wherein the slip ring box is for providing power, control and/or data connections to at least one of the sensor cable and the lead-in cable, and wherein the lead-in cable and the sensor cable may be deployed or recovered independently of each other.

Thus, by means of the invention, a desired length of each cable may be deployed and then recovered without the need for two separate winches. In addition, it is possible to access the two cables for maintenance, repairs, or to change sensors on the sensor cable. A further advantage is that, since the two compartments preferably rotate together, no additional hydraulic or electrical power supply is required. Thus, the invention provides the same functional benefits as the two-winch arrangement but comes at a significantly lower cost and will normally not require any additional deck space.

As noted above, the two compartments are preferably arranged to rotate together, for example by being formed as parts of a common rotating structure, typically a winch drum. Thus, the two compartments are preferably co-axial.

Whilst it is possible to arrange the separate cable compartments in different ways the preferred arrangement is co-axial compartments axially off-set from each other. This also has the advantage of providing ready access to either cable. A convenient structure is to provide a radially extending wall, for example, in the form of an annular disc around the centre of a winch drum, that separates the two compartments.

Another convenient structure of radially extending wall may be provided where the winch comprises a rotatable drum having sidewalls and the compartment for lead-in cable is formed as an annular recess in one of the sidewalls. Thus, one of the main sidewalls may have an annular recess formed in it or provided on it, for example by attaching a suitably shaped member to the outside of the wall of a conventional single winch, as will be discussed further below.

The inboard, fixed end of the cables are preferably fed to their respective compartments via openings at the axial end(s) of the winch. The opening(s) are preferably provided by means of slip ring box(es) mounted in the axle(s) of the winch. Such slip ring boxes are known in the art for use with conventional winches. However, since the winch of the invention has two compartments, it preferably further comprises means for selectively feeding a cable from/to the first or second cable compartment to/from the opening(s) to facilitate selective deployment and recovery of cable from each compartment.

The outboard (free) ends of the cables are preferably fed from the outside of their respective compartments, i.e. in the conventional manner.

Although it is envisaged that winches according to the invention would be supplied as complete units, it is also convenient to convert a conventional single winch to provide a winch according to the invention. Thus, a compartment for the lead-in cable may be attached, e.g. welded or bolted, to an existing cable winch drum. This ability to retrofit an existing winch is a further advantage of the invention.

The invention also extends to a method of deploying and/or recovering a composite seismic cable using the seismic data acquisition system or the winch system described above.

The invention also extends to a method of using the winch, thus, viewed from a still further aspect, the invention provides a method of deploying a composite seismic cable comprising a lead-in cable and a sensor cable, the method comprising: providing a winch having a first cable compartment holding the lead-in cable and a second cable compartment holding the sensor cable; wherein: a desired length of the sensor cable is deployed from the second cable compartment; the deployed sensor cable is disconnected from the sensor cable remaining in the second compartment; the deployed length of sensor cable is connected to the lead-in cable, and then the lead-in cable is deployed from the first compartment, thereby deploying the composite cable.

Preferably, the method comprises the use of the winch system described above and its preferred forms.

An embodiment of the invention will now be described, by way of example only, and with reference to the accompanying drawings:—

FIG. 6A to 6D are schematic views of the winch of FIG. 5 in operation.

Figure 1:
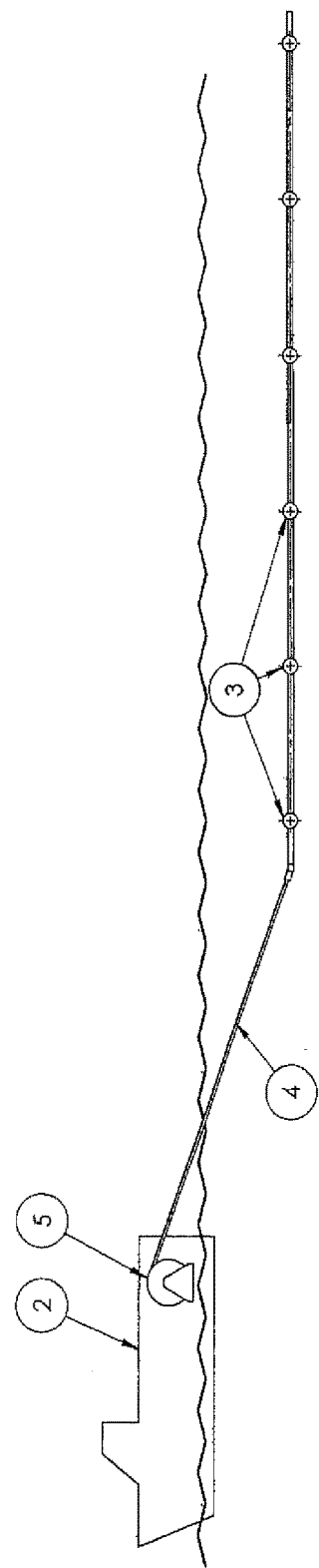
FIG. 1 is a schematic view of a vessel towing a seismic sensor cable.

FIG. 1 illustrates marine seismic data acquisition being performed by towing multiple sensor cables 1 (one shown) behind a vessel 2. Each sensor cable is 4-12 km long and has hydrophone sensors 3 equally spaced along the cable. The sensor cable is made up of several sections typically 150 meters long allowing the length of the sensor cable to be changed. The sensor cable is connected to the vessel by a lead-in cable 4 providing electrical power and data connections to and from the sensor cable. The lead-in cable is typically 1000-1500 meters long. The cables 1, 4 are deployed and recovered using winch drum(s) 5 mounted at the rear of the vessel 2.

Figure 2:
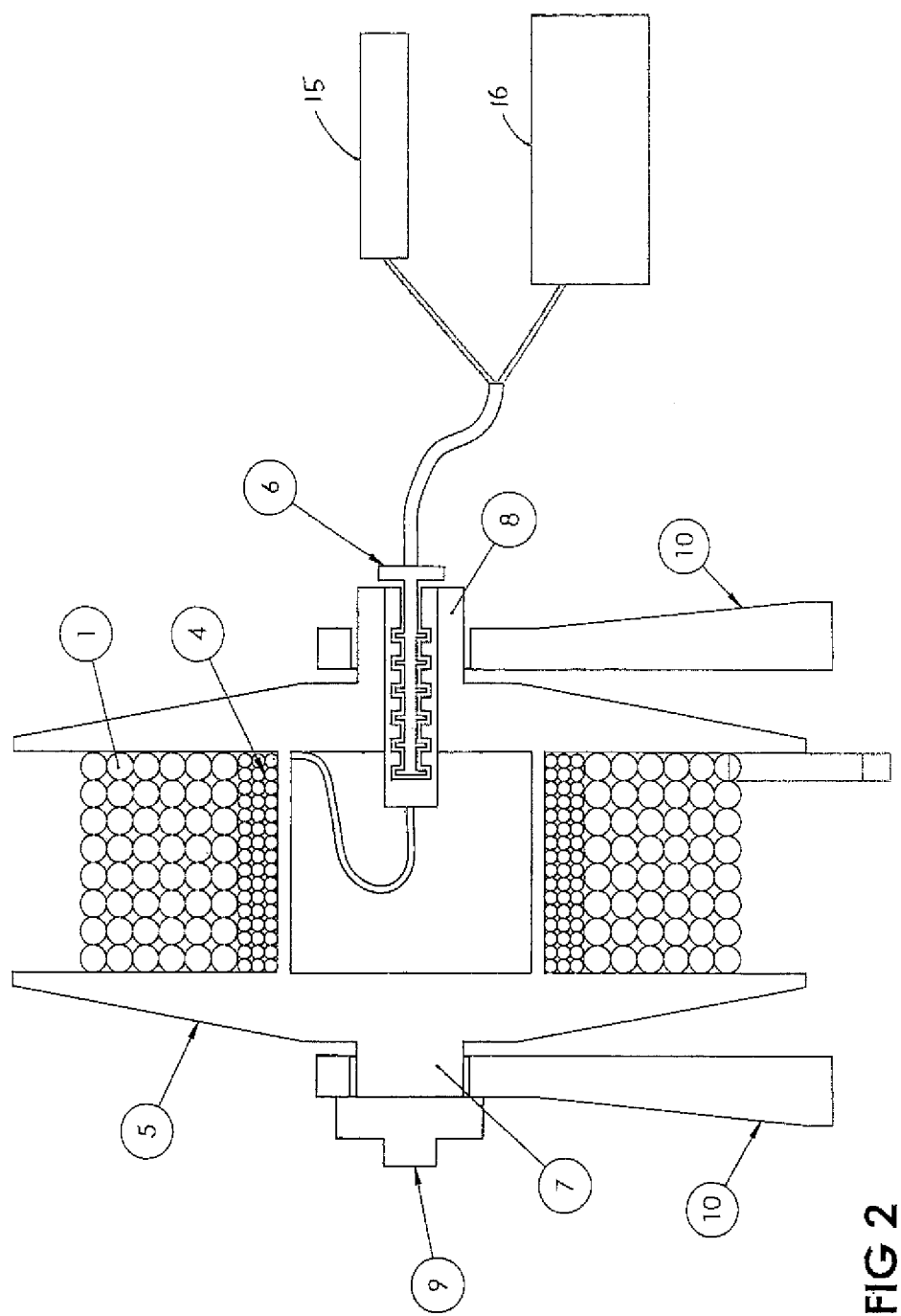
FIG. 2 is a cross-section of a prior art common winch.

FIG. 2 shows a first prior art winch arrangement as used on vessel 2. The lead-in cable 4 and the sensor cable 1 are shown stored on a common winch drum 5 with the sensor cable 1 spooled on top of the lead-in cable 4 on drum 5. The cables are fed to the drum via a slip ring box 6. The drum has axles 7, 8, with slip ring box 6 being formed in axle 7 and a drive unit 9 being connected to axle 8. The axles are supported by bearings (not shown) mounted in foundations 10, which support the winch drum above the deck of the vessel.

The slip ring box 6 allows electrical and control/data connections to be made between, on the one hand, a power supply, control system and data recording computers on board the vessel and, on the other, the lead-in cable 4 through axle 8. Thus, connections are provided to the cable as the drum 5 is driven by drive unit 9 in order to deploy or recover the sensor cable 1 and lead-in cable 4.

The free end of cable 1 is led from the outside of the drum to the sea.

Figure 3:
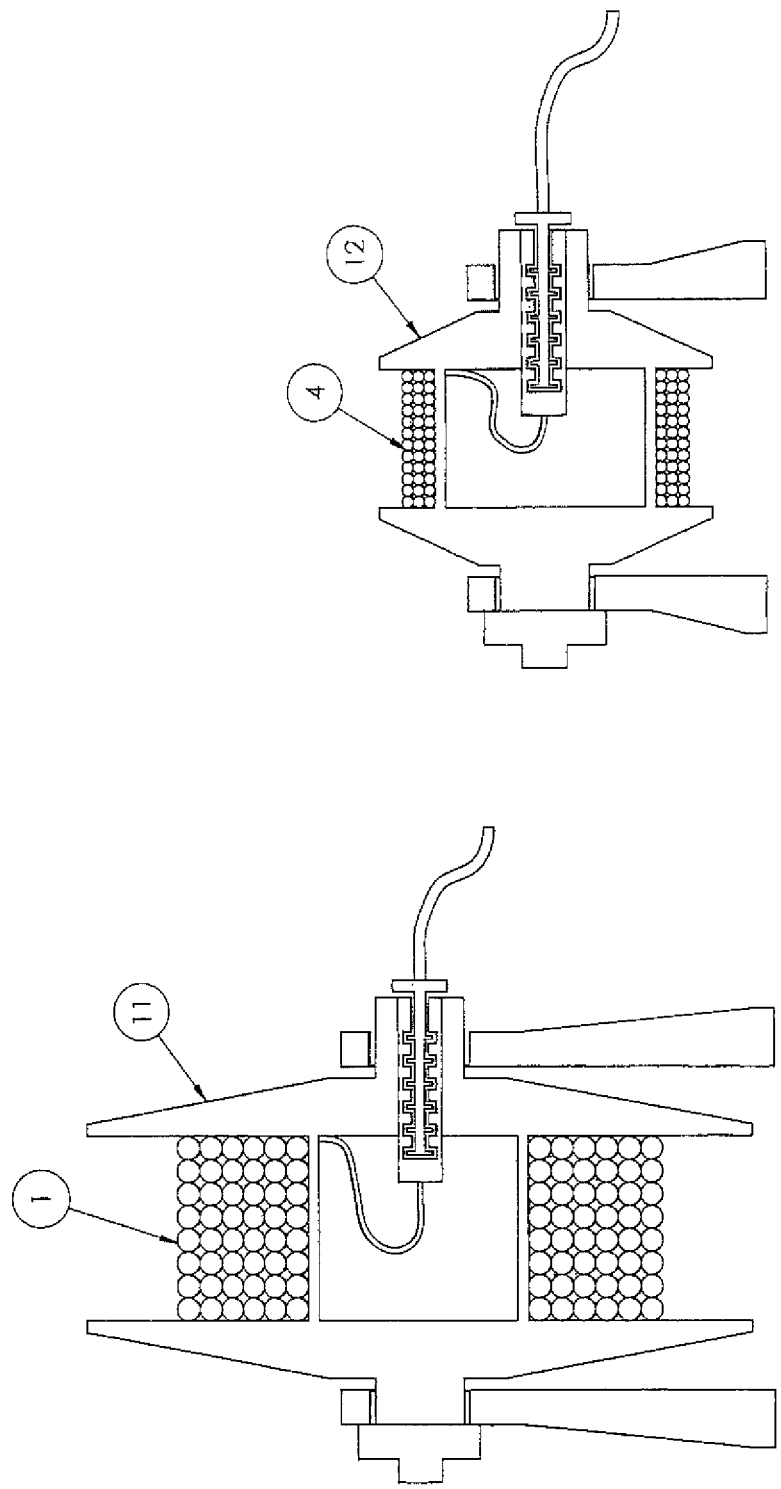
FIG. 3 is a cross-section of a prior art two-winch system.

FIG. 3 shows an alternative prior art winch system where two winches are used, with winch 11 being used for the sensor cable 1 and winch 12 used for the lead-in cable 4. The structure of winch 11 is similar to that of that previously described, with winch 12 also being similar, but somewhat smaller.

Figure 4A:
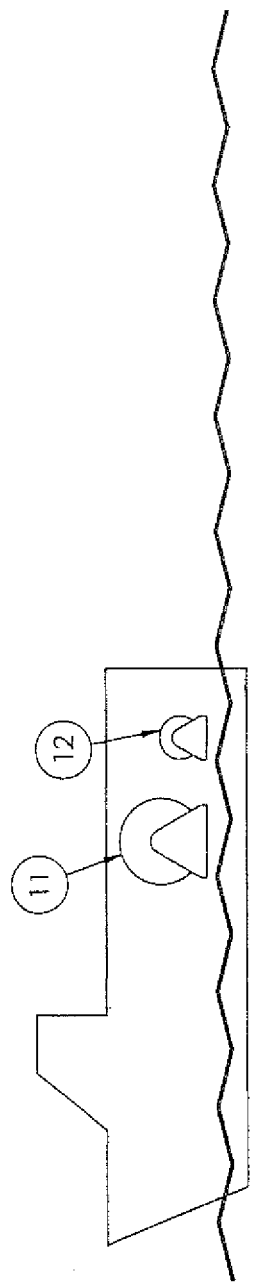
FIGS. 4A to 4D are schematic views of the two-winch system of FIG. 3 in operation.
Figure 4B:
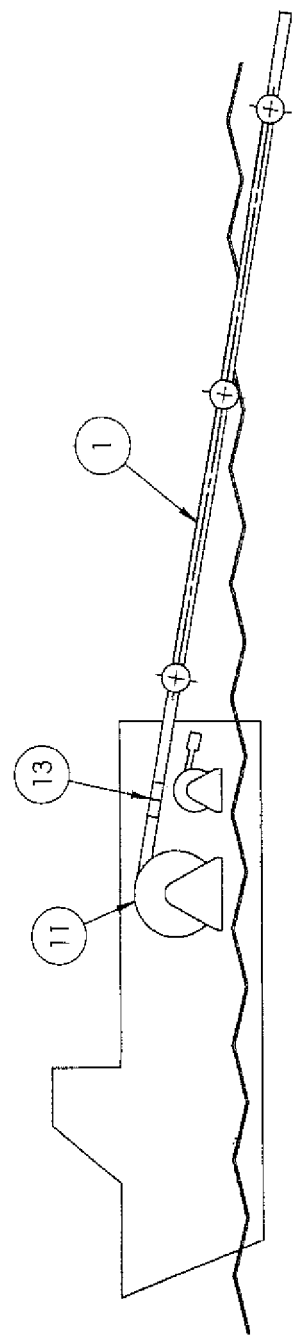

FIGS. 4A to 4D illustrate the deployment of the cable system from the two-winch system of FIG. 3. Initially, as shown in FIG. 4A, both cables are stored on their respective winches, 11, 12. Then, as shown in FIG. 4B, the sensor cable 1 is first deployed from its winch 11. When the desired length has been deployed, a part of the proximal end of the sensor cable is made fast to a dedicated strong point (not shown) on the vessel so that connector 13 which connects adjacent lengths of the sensor cable 1 may be disconnected so that the deployed part of the sensor cable 1 is separated from the remainder on winch 11.

Figure 4C:
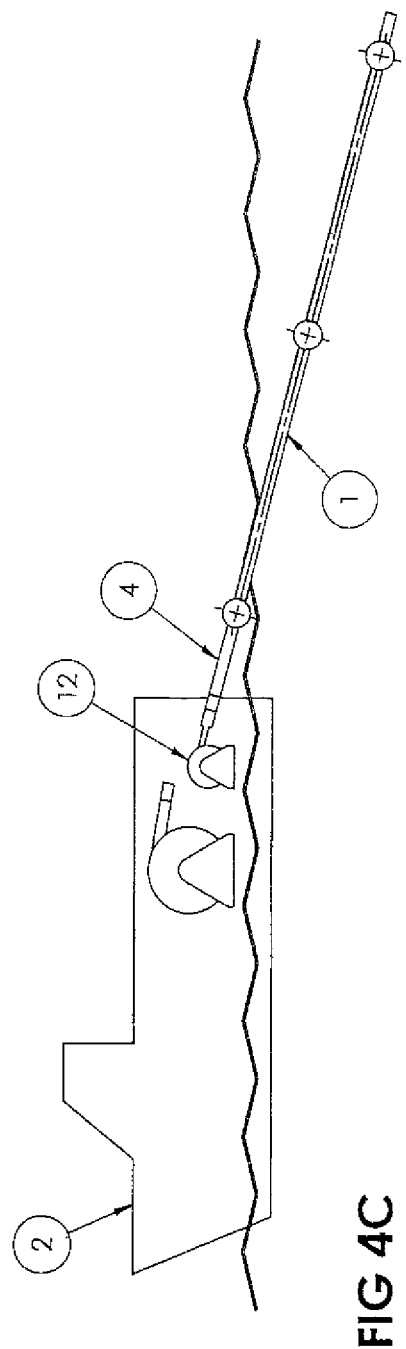
Figure 4D:
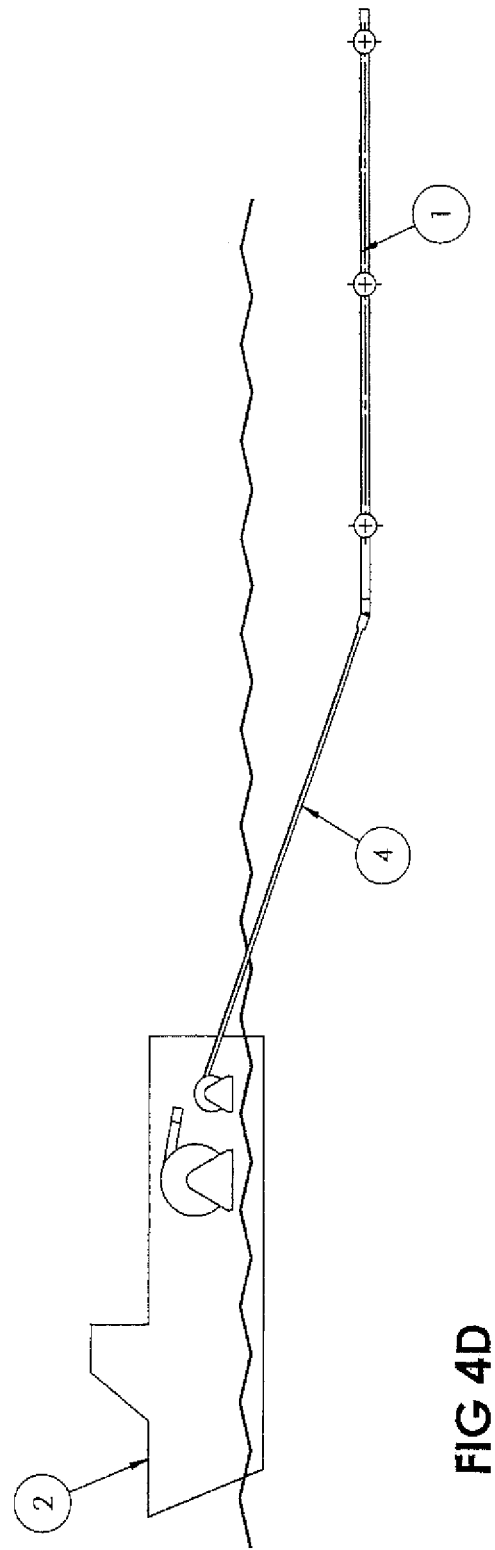

A short portion of lead-in cable 4 is then deployed from its winch 12 to enable it to be connected to the proximal end of deployed sensor cable 1 at connection point 13. The sensor cable 1 is then detached from the dedicated strong point so that it is connected to the vessel only via lead-in cable 4 and winch 12, as shown in FIG. 4C. The desired length of lead-in cable 4 is then deployed, as shown in FIG. 4D.

The reverse process is used to recover the cable system.

Figure 5:
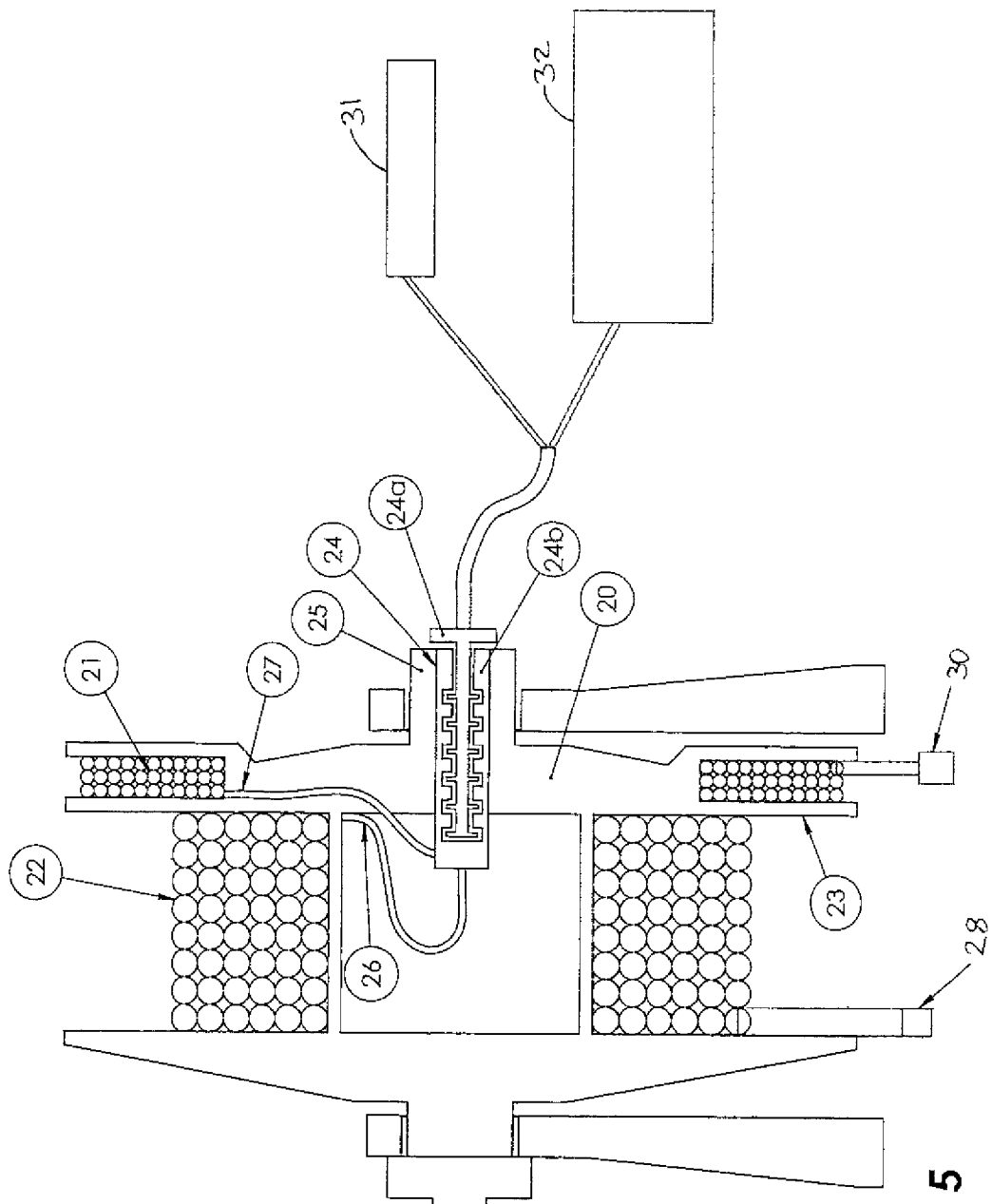
FIG. 5 is a cross-section of a winch according to an embodiment of the present invention.

An embodiment of the invention is shown in FIGS. 5 and 6A to 6D. With reference to FIG. 5, it comprises a single winch 20, which differs from the prior art single winch system shown in FIG. 2 in that it is provided with two separate compartments 21, 22 for the lead in cable 4 and the sensor cable 1 respectively.

The compartment 22 for the sensor cable 1 corresponds to the single cable compartment of prior art winch drum 5, with the compartment 21 for the lead-in cable being formed as an annular recess in one side of the drum wall. Thus, a radially-extending wall 23 separates cables 1 and 4.

A single slip-ring box 24 is provided in axle 25, again as in the FIG. 2 drum, but in this case respective separate connections 26 and 27 are provided to the cables in each compartment. This arrangement enables connection to be maintained to the sensor cable 1 even during deployment and recovery. The slip ring box comprises an inner stationary part 24a, via which cables 1, 4 are connected to a power supply, control system and data recording computers on board the vessel, and an outer, rotating part 24b which is connected to the cables on the winch drum 20 via respective connections 26, 27.

The free ends of each cable 1, 4 are led from the outside of their respective compartments 22, 21 for deployment.

FIG. 5 illustrates the winch with both cables recovered. Deployment will now be described with reference to FIGS. 6A to 6D.

To deploy the cable system, as shown in FIG. 6A, first the desired length of sensor cable 1 is deployed from its compartment 22 so that the end 28 of a section of the sensor cable is accessible from the vessel. This is then made fast to a dedicated strong-point on the vessel in the same manner as when the FIG. 3 prior art system is used. A connector 29 may then be disconnected so that the deployed part of sensor cable is disconnected from winch 20.

At this point, a short length of lead-in cable 4 is deployed from its compartment 21 so that the free end 30 of that cable may be connected to the free end 28 of sensor cable 1, as shown in FIG. 6C. The sensor cable is then released from the strong point on the vessel before the desired length of lead-in cable 4 is deployed, thereby completing deployment of the sensor cable system, as shown in FIG. 6D.

Recovery of the cable system is the reverse of deployment.

The invention claimed is:

1. A seismic data acquisition system comprising:
   a composite marine seismic cable and a winch,
   the composite marine seismic cable comprising a sensor cable and a lead-in cable for providing electrical connections to the sensor cable, and
   the winch comprising a first cable compartment for the lead-in cable and a second cable compartment for the sensor cable,
   wherein a desired length of the sensor cable is disconnectable from the sensor cable remaining in the second cable compartment, and
   wherein the lead-in cable and the sensor cable are able to be deployed or recovered independently of each other.

2. A seismic data acquisition system as claimed in claim 1, wherein the first and second cable compartments are arranged to rotate together when the winch is operated.

3. A seismic data acquisition system as claimed in claim 1, wherein the first and second cable compartments are co-axial.

4. A seismic data acquisition system as claimed in claim 1, wherein the first cable compartment is axially offset from the second cable compartment.

5. A seismic data acquisition system as claimed in claim 4, wherein the first and second cable compartments are separated by a radially-extending wall.

6. A seismic data acquisition system as claimed in claim 1, wherein the winch comprises a rotatable drum having sidewalls and the compartment for lead-in cable is formed as an annular recess in one of the sidewalls.

7. A seismic data acquisition system as claimed in claim 1, wherein the cables are fed to/from their respective compartments from the radially outer parts thereof.

8. A seismic data acquisition system as claimed in claim 7, wherein power, control and/or data connections to the cables provided by means of slip ring box(es) mounted in an axle of the winch.

9. A seismic data acquisition system as claimed in claim 1 wherein the winch is a single winch to which a compartment for the lead-in cable has been added.

10. A seismic data acquisition system as claimed in claim 1, wherein the compartment for the lead-in cable comprises a side wall that is welded or bolted onto an existing cable winch drum.

11. A method of deploying and/or recovering a composite seismic cable using a seismic data acquisition system, comprising the step:
    deploying and/or recovering the composite seismic cable using a seismic data acquisition system comprising a composite marine seismic cable and a winch, the composite marine seismic cable comprising a sensor cable and a lead-in cable for providing electrical connections to the sensor cable, and the winch comprising a first cable compartment for the lead-in cable and a second cable compartment for the sensor cable,
    wherein a desired length of the sensor cable is disconnectable from the sensor cable remaining in the second cable compartment, and
    wherein the lead-in cable and the sensor cable are able to be deployed or recovered independently of each other.

12. A method of deploying a composite seismic cable comprising a lead-in cable and a sensor cable, the method comprising: providing a winch having a first cable compartment holding the lead-in cable and a second cable compartment holding the sensor cable; wherein: a desired length of the sensor cable is deployed from the second cable compartment; the deployed sensor cable is disconnected from the sensor cable remaining in the second compartment; the deployed length of sensor cable is connected to the lead-in cable, and then the lead-in cable is deployed from the first compartment, thereby deploying the composite cable.

13. The method of deploying a composite seismic cable as claimed in claim 12, wherein the method comprises using a seismic data acquisition system comprising a composite marine seismic cable and a winch, the composite marine seismic cable comprising a sensor cable and a lead-in cable for providing electrical connections to the sensor cable, and the winch comprising a first cable compartment for the lead-in cable and a second cable compartment for the sensor cable, wherein the lead-in cable and the sensor cable are able to be deployed or recovered independently of each other, and wherein the first and second cable compartments are arranged to rotate together when the winch is operated.

14. The method of deploying a composite seismic cable as claimed in claim 12, wherein the method comprises using a seismic data acquisition system comprising a composite marine seismic cable and a winch, the composite marine seismic cable comprising a sensor cable and a lead-in cable for providing electrical connections to the sensor cable, and the winch comprising a first cable compartment for the lead-in cable and a second cable compartment for the sensor cable, wherein the lead-in cable and the sensor cable are able to be deployed or recovered independently of each other, and wherein the first and second cable compartments are co-axial.

15. The method of deploying a composite seismic cable as claimed in claim 12, wherein the method comprises using a seismic data acquisition system comprising a composite marine seismic cable and a winch, the composite marine seismic cable comprising a sensor cable and a lead-in cable for providing electrical connections to the sensor cable, and the winch comprising a first cable compartment for the lead-in cable and a second cable compartment for the sensor cable, wherein the lead-in cable and the sensor cable are able to be deployed or recovered independently of each other, and wherein the first cable compartment is axially offset from the second cable compartment, and wherein the first and second cable compartments are separated by a radially-extending wall.

16. The method of deploying a composite seismic cable as claimed in claim 12, wherein the method comprises using a seismic data acquisition system comprising a composite marine seismic cable and a winch, the composite marine seismic cable comprising a sensor cable and a lead-in cable for providing electrical connections to the sensor cable, and the winch comprising a first cable compartment for the lead-in cable and a second cable compartment for the sensor cable, wherein the lead-in cable and the sensor cable are able to be deployed or recovered independently of each other, and wherein the winch comprises a rotatable drum having sidewalls and the compartment for lead-in cable is formed as an annular recess in one of the sidewalls.

17. The method of deploying a composite seismic cable as claimed in claim 12, wherein the method comprises using a seismic data acquisition system comprising a composite marine seismic cable and a winch, the composite marine seismic cable comprising a sensor cable and a lead-in cable for providing electrical connections to the sensor cable, and the winch comprising a first cable compartment for the lead-in cable and a second cable compartment for the sensor cable, wherein the lead-in cable and the sensor cable are able to be deployed or recovered independently of each other, and wherein the cables are preferably fed to/from their respective compartments from the radially outer parts thereof.

18. The method of deploying a composite seismic cable as claimed in claim 12, wherein the method comprises using a seismic data acquisition system comprising a composite marine seismic cable and a winch, the composite marine seismic cable comprising a sensor cable and a lead-in cable for providing electrical connections to the sensor cable, and the winch comprising a first cable compartment for the lead-in cable and a second cable compartment for the sensor cable, wherein the lead-in cable and the sensor cable are able to be deployed or recovered independently of each other, and wherein the compartment for the lead-in cable comprises a side wall that is welded or bolted onto an existing cable winch drum.

\* \* \* \* \*